United States Patent [19]
Bauer et al.

[11] Patent Number: 5,593,209
[45] Date of Patent: Jan. 14, 1997

[54] LOCKING DEVICE FOR A LONGITUDINAL-ADJUSTMENT DEVICE OF A VEHICLE SEAT WITH A SEAT SUPPORT TO WHICH AN ACTIVATION LEVER OF THE LOCKING DEVICE IS LATERALLY HINGED

[75] Inventors: Heinz Bauer; Burckhard Becker; Ernst-Reiner Frohnhaus, all of Solingen, Germany

[73] Assignee: Firma C. Rob. Hammerstein GmbH, Germany

[21] Appl. No.: 152,818

[22] Filed: Nov. 15, 1993

[30] Foreign Application Priority Data

Nov. 14, 1992 [DE] Germany ............................ 42 38 483.4
Dec. 5, 1992 [DE] Germany ............................ 42 40 943.8

[51] Int. Cl.[6] ............................................. A47C 1/02
[52] U.S. Cl. .............................. 297/344.13; 297/344.15
[58] Field of Search ........................ 297/344.13, 344.12, 297/344.1, 337, 341, 344.24, 311, 344.14, 344.15; 248/419, 420, 429

[56] References Cited

U.S. PATENT DOCUMENTS 3,460,794  8/1969  Colautti ........................... 248/420 X
3,476,435  11/1969 Hitzelberger ..................... 248/429 X
3,582,033  6/1971  LaFleche et al. ................. 248/420 X
4,378,101  3/1983  Kazaoka et al. ..................... 248/429
4,381,096  4/1983  Roper .................................. 248/429
4,687,251  8/1987  Kazaoka et al. .................... 297/337

FOREIGN PATENT DOCUMENTS 54434    3/1938  Denmark ......................... 248/420
2545763  4/1977  Germany.
2729770  1/1979  Germany.
3143431  5/1983  Germany.
57-84234 5/1982  Japan ........................... 297/344.12
1160182  7/1969  United Kingdom.

Primary Examiner—Milton Nelson, Jr.
Attorney, Agent, or Firm—Quarles & Brady

[57] ABSTRACT

A locking device for a longitudinal-adjustment device of a vehicle seat. The longitudinal-adjustment device includes two pairs of rails, each of which being releasably lockable by a catch and consisting of a floor rail and a seat rail. The seat rails being connected to a seat support through a height-adjustment device. An activation lever of the locking device is laterally hinged to the seat support and serves to activate the catch. This activation lever is hinge-connected to a transmission link which in turn is hinged to the seat rail and has a locking area which includes the catch or activates a separate catch.

14 Claims, 1 Drawing Sheet

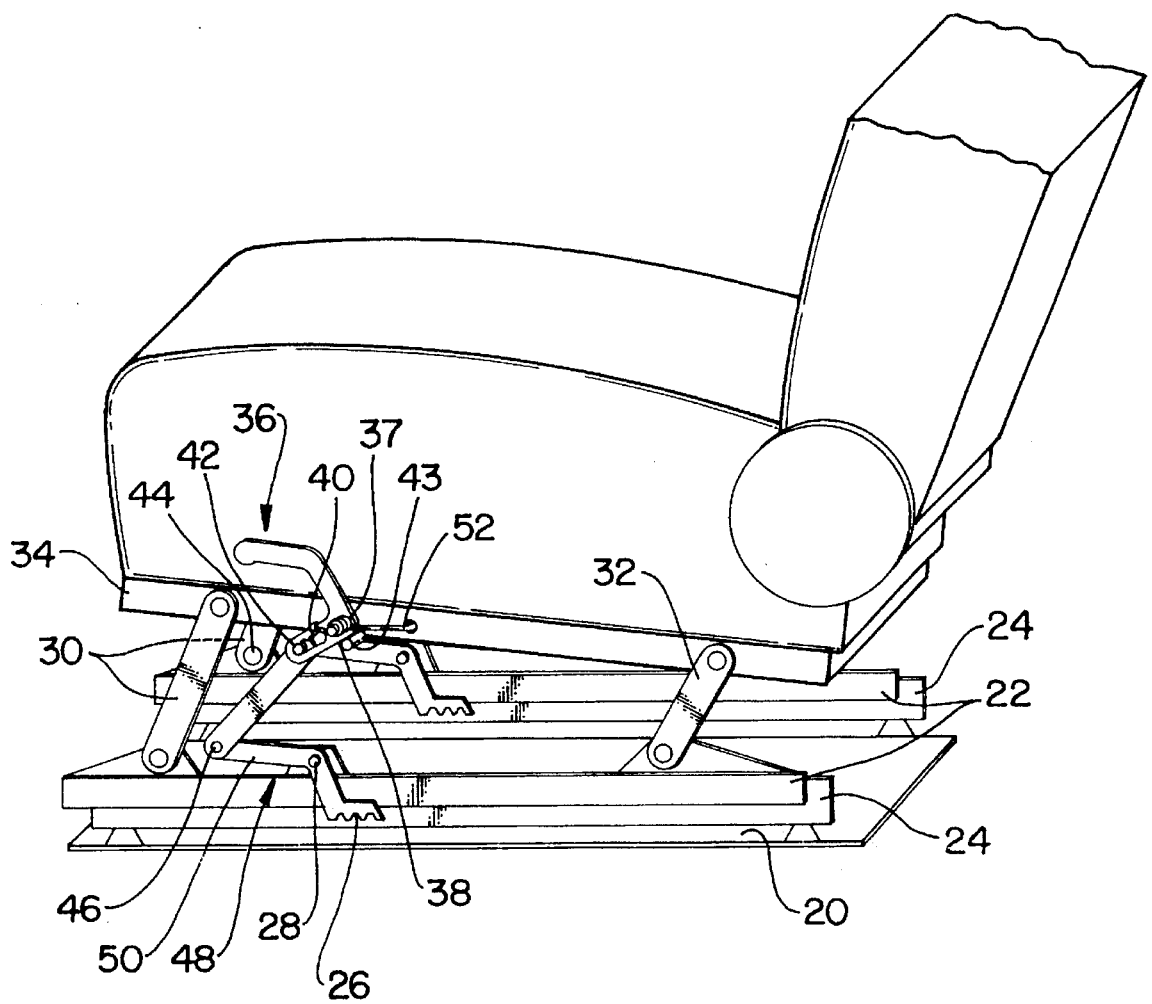

LOCKING DEVICE FOR A LONGITUDINAL-ADJUSTMENT DEVICE OF A VEHICLE SEAT WITH A SEAT SUPPORT TO WHICH AN ACTIVATION LEVER OF THE LOCKING DEVICE IS LATERALLY HINGED

BACKGROUND OF THE INVENTION

1. Field of the Invention

This invention relates to a longitudinal-adjustment device of a vehicle seat, in which the longitudinal-adjustment device has two pairs of rails, each of which can be releasably locked by means of a catch, and each of which consists of a floor rail and a seat rail, the seat rails being connected via a height-adjustment device to a seat support, and an activation lever of the locking device, which serves to activate the catch, is laterally hinged to the seat support.

2. Description of the Prior Art

In this type of locking device of prior art, the activation lever hinged laterally to the seat support is directly connected to the catch through a Bowden wire. Thus it is possible to locate the activation lever at the side of the seat support and to transfer the locking motion to the catch without this transfer being dependent on the position of the height-adjustment device. The location of the activation lever at the side of the seat support has the advantage that the activation lever is located where it is easy to reach and ergonomically correct; it can be grasped without having to twist the hand or the arm. In the construction of prior art, the activation lever is pulled upward in order to release the catch; the activation lever is prestressed by a spring and returns automatically to its initial position as soon as it is released.

This well-known construction of the locking mechanism has basically proved successful, but the Bowden wire must be judged as disadvantageous. On the one hand the assembly and maintenance of the Bowden wire are costly, and on the other hand a Bowden wire is relatively expensive.

SUMMARY OF THE INVENTION

Now the invention comes to its own. It has the object of further developing the locking mechanism of the type initially mentioned in such a way that, while retaining the advantages, the Bowden wire can be eliminated and replaced by a transmission device for the locking force which is more economical in terms of installation, maintenance and initial cost, is better suited for recycling, and which always remains in a predetermined region under the seat support.

Starting out from the locking device of the type initially mentioned, this object is achieved by the activation lever hinge-jointed to a transfer element, which in turn is hinge-jointed flexibly to a locking lever, which in its turn is hinged to the seat rail and is associated with a locking area for the activation of the catch.

Thus, according to the invention, the Bowden wire is replaced by a lever arrangement. This can be made from the same material as the seat rails and the other metal parts of the seat, such that it can be recycled without the need for prior dismantling. In particular, the locking device according to the invention can be designed in such a way, that the movement of its individual parts largely corresponds to the positions of the height-adjustment device, so that safe functioning and a rattleproof design are possible with the simplest design of the transfer mechanism.

The locking device according to the present invention is suitable for every type of height-adjustment device. In the context of this invention, the term "height-adjustment device" includes adjustment devices for the front edge of the seat as well as for the rear edge of the seat and height-adjustment devices for the seat as a whole. In particular, the locking mechanism of the invention is suited for a so-called parallelogram height-adjustment device, in which the seat support is connected both in its front region and in its rear region to the corresponding seat rail via a left and a right swivel arm respectively. If, in a further development, a swivel arm is replaced by a hinge-connected arrangement of two levers, thus departing from simple parallelogram kinematics, every edge of the seat can be adjusted independently of the other.

In an advantageous further development of the invention, the hinge connection between the activation arm and the transmission link is formed by a shaft in the one part that is engaged in an elongated hole of the other part.

The latter extends preferably in the longitudinal direction of the transmission link or the activation arm. In this way differences between the paths of the activation lever and the catch can be compensated for, which may occur depending on the particular design of the height-adjustment device, and which cannot be totally compensated by means of a tightly fitting hinge arrangement. The transmission relations between the activation lever and the catch are hardly altered by the arrangement of shaft and elongated hole, so that the activation path at the activation lever remains practically constant, independently of the position of the height-adjustment device.

This type of elongated hole is generally not necessary in a simple parallelogram height-adjustment device. In this kind of device, small differences in the paths are compensated for by the fact that the activation lever participates in the movement, in so far as this is necessary at all. In terms of construction, the activation lever is designed and dimensioned in such a way that its upper hinge area can move along an arc of a circle coinciding as closely as possible with the arc of the parallelogram kinematics of the seat support.

Instead of an elongated hole, there are other possible ways to compensate for differences between the paths. For example, the transmission link need not be rigid, but may also consist of two separate parts longitudinally slidable against each other and thus longitudinally guided along each other. Round holes with a certain amount of clearance can also be provided.

The range of movement of the locking device according to the invention and the range of movement of a front swivel arm of the height-adjustment device are all the more similar, the closer the hinge connection between the activation arm and the transmission link is located to the hinge connection between the seat support and the front swivel arm; this condition is also fulfilled, the closer the hinge connection between the transmission link and the locking lever is located to the hinge connection between the floor rail and the front swivel arm of the height-adjustment device. Likewise, said condition is more easily fulfilled, if the transmission link has a length corresponding to the length of the front swivel arm of the height-adjustment device. The design of the locking device according to the invention makes possible an arrangement of the catch in the optimal position which is most favourable for locking. Thus, in terms of construction there is a relatively large degree of freedom regarding the location of this catch device; likewise, a relatively wide range is available for the location of the activation lever on the seat support.

BRIEF DESCRIPTION OF THE DRAWING

FIG. 1 is a schematic side view of a vehicle seat.

DESCRIPTION OF THE PREFERRED EMBODIMENT

Further advantages and features of the invention are revealed in the remaining claims and the following description of an embodiment of the invention, not to be interpreted as restrictive, which is explained in detail with reference to the drawing. The vehicle seat according to the single figure is connected to an underbody 20 of the corresponding vehicle via a longitudinal-adjustment device consisting of two pairs of rails. Each pair of rails consists of a seat rail 22 and a floor rail 24. Their arrangement and design is in itself known; see the previous publications DE 31 43 431 C2 and DE-OS 25 45 763. They are releasably locked by a catch whose concrete design is not relevant here; see the previous publications GB 11 60 182 and DE 27 29 770 C2, which, however, are merely listed as examples. This means that in their normal position the two rails 22, 24 are locked by the catch 26. In a well-known manner each of the two pairs of rails of the vehicle seat has a catch 26 of this type; the two catches are synchronised with each other by means of a transversely extending shaft 28. Thus a single activation device is sufficient for both catches 26; this device will be described in more detail below.

In a well-known manner, the seat has a height-adjustment device, which is represented here by two parallelogram swivel arms 30, 32. They are adjustable; however, in order to simplify the drawing, the adjustment device itself is not shown, as it is in itself known.

The two swivel arms 30, 32 carry a seat support 34 on which the actual seat is located together with its backrest. An activation lever 36 is hinged in a swivel joint 37 to the seat support on one side of the support, e.g. the side toward the door. The activation lever has two arms; it consists of a handle slanting upwards and an activation arm 38; the two arms stand at an angle of about 80°, i.e. in a V-shape. At the free end of the activation arm 38 there is an elongated hole 40 essentially extending in the direction of the activation arm 38. A hinge shaft 42, which is part of a rigid transmission link 44, is engaged into this elongated hole. In all positions in relation to the floor rail, into which the seat support 34 can be adjusted by means of the height-adjustment device, the transmission link and the elongated hole 40 always stand at an angle, which is significantly larger than the self-locking angle of the materials used. In the embodiment the angle is 22° and can lie, for example, between 10° and 80°.

In another embodiment not shown the activation lever 36 has one arm. The transmission link 44 is hinged between its handle and its swivel joint 37.

Preferably a stop 43 is associated with the activation lever 38; the lever is biased against this stop in the rest position of the handle (normally the lowest position); here it is elastically prestressed in the direction toward the stop by a spring 52. Preferably a stop is also provided in order to limit the swivelling movement in the direction of activation (normally upwards).

At the other end of the transmission link 44 a hinge connection 46 to a two-armed locking lever 48 is provided, that is to a catching arm 50 of this locking lever 48. The other arm of the locking lever 48 is referred to as the locking arm; it supports the actual catch element of the catch 26. As shown in the figure, the two arms of the locking lever 48 stand at an oblique angle. This design is, however, only an example; the locking lever 48 can also be one-armed. In contrast to the drawing it is also possible for the catch 26 not to be located behind the hinge connection 46 but rather in front of it. Furthermore, the locking lever 48 need not support the actual catch 26; instead, the catch can be separate and interact with the locking lever.

The locking lever 48 is mounted to the seat rail 22 swivelling around the shaft 28 to form a bearing. The locking lever 48 is hinged to the seat rail 22. This is not to be interpreted in the way that the locking lever 48 must be directly hinged to the seat rail 22; it may be hinged there but it may also be hinged to an additional member which is rigidly connected to the seat rail 22, for example a bearing elbow.

The inner length of the elongated hole 40 is dimensioned in such a way that in all positions of the height-adjustment device the described transmission arrangement located between the activation lever 36 and the catch 26 does not transfer any mechanical tension. In other words, in the embodiment shown here, the departure of the kinematics of the described lever arrangement for transmission of the locking motion from the kinematics of the height-adjustment device should be balanced out by means of the elongated hole 40. The deviation described becomes smaller in proportion to how closely the transmission link 44 coincides with the front swivel arm 30 in terms of both the length and the bearing points. Normally no elongated hole is required in a parallelogram height-adjustment device. Small deviations are compensated for by means of a slight nodding movement of the activation lever 38.

In another design of the height-adjustment device, for example an exclusive adjustment device for the front edge of the seat or an adjustment device as shown, but with a V-shaped arrangement of two levers instead of the rear swivel arm 32, the lever arrangement for the transmission of the locking force is designed accordingly and the elongated hole 40 is adjusted accordingly.

In a parallelogram height-adjustment device, the seat-support hinges of both swivel arms move along a curve. The length of the transmission link 44 is selected and the hinge connection 46 is located in such a way that in a seat adjustment operation the swivel joint 37 moves in an arc which approximates this curve as closely as possible.

We claim:

1. In a vehicle seat having a longitudinal adjustment device, wherein the longitudinal-adjustment device includes two pairs of rails (22, 24), each of said two pairs of rails being releasably lockable by means of a locking device having a catch (26), and including a floor rail (24) and a seat rail (22), said vehicle seat including a seat support and a height adjustment device for height adjustment of the vehicle seat independent of the longitudinal adjustments thereof, the seat rails (22) being connected to the seat support (34) through the height-adjustment device (30, 32), said locking device comprising an activation lever (36) of the locking device laterally hinged to the seat support (34) and defining a hinge point, said activation lever serving to activate the catch (26), said locking device having a movable transmission link and a locking lever, wherein the activation lever (36) is connected to the transmission link (44) by means of a hinge connection for transmitting a movement of the activation lever to the locking lever independent of the position of the height adjustment device which in turn is hinge-connected to the locking lever (48), said locking lever being hinged to the seat rail and having a locking area which includes one from a group including the catch (26) and means for activating a separate catch.

2. The apparatus according to claim 1, wherein the activation lever has an activation arm and the hinge connection between the activation arm (38) and the transmission link (44) includes a shaft (42) which is engaged in an elongated hole (40).

3. The apparatus according to claim 2, wherein the elongated hole (40) extends essentially parallel to the lengthwise direction of the group including the transmission link (44) and the activation arm (38).

4. The apparatus according to claim 1, wherein the activation lever has an activation arm and the hinge connection between the activation arm (38) of the activation lever and the transmission link (44) is located near a hinge connection between the seat support (34) and a front swivel arm (30) of the height-adjustment device.

5. The apparatus according to claim 1 characterized in that the hinge connection between the transmission link (44) and the locking lever (48) is located near a hinge connection between the floor rail (24) and a front swivel arm (30) of the height-adjustment device.

6. The apparatus according to claim 1, wherein the height-adjustment device has a front swivel arm and the transmission link (44) has a length corresponding to the length of the front swivel arm (30) of the height-adjustment device, and is 50% to 110% of the length of said front swivel arm (30).

7. The apparatus according to claim 1, wherein the catch (26) is essentially located in the middle of the longitude length of the two pairs of rails (22, 24).

8. The apparatus according to claim 1, wherein the activation lever has an activation arm and the hinge point between the activation arm of the activation lever (36) and the seat support (34) is located at a greater distance from the front edge of the seat support (34) than is the hinge connection between the activation arm (38) and the transmission link (44).

9. The apparatus according to claim 1, wherein the locking lever (48) has two arms, namely a locking arm and a catching arm (50), and said locking and catching arms are arranged in an angle that is between 90° and 180° relative to each other.

10. The apparatus according to claim 1, characterized in that a hinge point of a front swivel arm (30) of the height-adjustment device on the seat support (34) is closer to the front edge of said seat support (34) than is the hinge point of the activation lever (36) on the seat support (34).

11. The apparatus according to claim 1, characterized in that the activation lever (36) has an activation arm (38) rigidly mounted to it in a V-shape, the activation arm being hinge-connected to the transmission link (44).

12. The apparatus according to claim 1, characterized in that at least one stop (43) is associated to the activation lever (36).

13. The apparatus according to claim 1, characterized in that the activation lever (36) is held in a rest position by a spring.

14. The apparatus according to claim 1, wherein the height-adjustment device is a parallelogram height-adjustment device and an arc of motion of a swivel joint (37) of the transmission link (44) around a hinge connection between the transmission link (44) and the locking lever (48) (46) approximates as closely as possible a motion curve of the seat support (34).

* * * * *